United States Patent
Yoshida

(10) Patent No.: US 11,128,252 B2
(45) Date of Patent: Sep. 21, 2021

(54) MOTOR DRIVE DEVICE

(71) Applicant: FANUC CORPORATION, Yamanashi (JP)

(72) Inventor: Tomokazu Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 111 days.

(21) Appl. No.: 15/875,339

(22) Filed: Jan. 19, 2018

(65) Prior Publication Data

US 2018/0212549 A1 Jul. 26, 2018

(30) Foreign Application Priority Data

Jan. 24, 2017 (JP) .............................. JP2017-010271

(51) Int. Cl.
*H02P 29/024* (2016.01)
*H02P 27/06* (2006.01)
(Continued)

(52) U.S. Cl.
CPC ............ *H02P 29/025* (2013.01); *H02M 1/32* (2013.01); *H02M 5/453* (2013.01); *H02P 27/06* (2013.01); *H02M 5/42* (2013.01); *H02P 2201/03* (2013.01)

(58) Field of Classification Search
CPC ...... G01R 31/343; G01R 31/42; G01R 31/34; H02K 11/001; G07C 3/00
(Continued)

(56) References Cited

U.S. PATENT DOCUMENTS

2010/0079093 A1* 4/2010 Kitanaka ............... H02H 7/0838
   318/400.3
2011/0238338 A1* 9/2011 Iwashita ............... H02P 29/025
   702/58
(Continued)

FOREIGN PATENT DOCUMENTS

CN 1465984 1/2004
CN 102201780 9/2011
(Continued)

OTHER PUBLICATIONS

Notification of Reasons for Refusal dated May 22, 2018 in corresponding Japanese Patent Application No. 2017-010271.
(Continued)

*Primary Examiner* — Kawing Chan
*Assistant Examiner* — Bradley R Brown
(74) *Attorney, Agent, or Firm* — Wenderoth, Lind & Ponack, L.L.P.

(57) ABSTRACT

A motor drive device has an abnormality detection function for a power supply unit between its own device and a power supply, and includes: a forward converter that is inputted AC power from the power supply via the power supply input part, and converts the AC power into DC power; a reverse converter that converts the DC power from the forward converter into AC power; a DC link capacitor provided to a DC link between the forward converter and the reverse converter; a voltage detection part that detects voltage of the DC link capacitor; and an abnormality detection part that obtains a voltage change amount for a predetermined time of the DC link capacitor based on voltage values detected by the voltage detection part, and performs abnormality detection on the power supply input part based on the voltage change amount thus obtained.

4 Claims, 2 Drawing Sheets

(51) Int. Cl.
*H02M 1/32* (2007.01)
*H02M 5/453* (2006.01)
*H02M 5/42* (2006.01)

(58) Field of Classification Search
USPC ........................................................ 318/490
See application file for complete search history.

(56) References Cited

U.S. PATENT DOCUMENTS

| | | | |
|---|---|---|---|
| 2012/0098475 A1* | 4/2012 | Noguchi | H02P 29/0241 |
| | | | 318/479 |
| 2014/0312822 A1* | 10/2014 | Ooi | H02H 11/005 |
| | | | 318/490 |
| 2015/0229246 A1* | 8/2015 | Matsumoto | H02P 6/001 |
| | | | 318/400.3 |
| 2016/0149531 A1 | 5/2016 | Yoshida | |

FOREIGN PATENT DOCUMENTS

| | | |
|---|---|---|
| CN | 104113258 | 10/2014 |
| CN | 104852600 | 8/2015 |
| JP | 2-164277 | 6/1990 |
| JP | 2007-228777 | 9/2007 |
| JP | 2007228777 A * | 9/2007 |
| JP | 2015-46962 | 3/2015 |
| JP | 2015-154566 | 8/2015 |
| JP | 2016-100977 | 5/2016 |
| JP | 2017-5973 | 1/2017 |

OTHER PUBLICATIONS

"Stromausfall", In: Wikipedia, Version 22.01.2017 14:02.
Office Action dated Jul. 29, 2019 in corresponding German Patent Application No. DE102018200907.4, with machine translation.
Office Action dated Feb. 27, 2019 in corresponding Chinese Application No. 201810054840.4.

* cited by examiner

MOTOR DRIVE DEVICE

This application is based on and claims the benefit of priority from Japanese Patent Application No. 2017-010271, filed on 24 Jan. 2017, the content of which is incorporated herein by reference.

BACKGROUND OF THE INVENTION

Field of the Invention

The present invention relates to a motor drive device having an abnormality detection function in a power supply input part.

Related Art

A motor drive device has been known that drives the motors within machine tools, industrial machines, forge rolling machines, injection molding machines or various robots. FIG. 2 is a view showing one example of such a motor drive device. The motor drive device 1X shown in FIG. 2 includes a forward converter 11 that converts three-phase AC power from an AC power supply 2 into DC power, and a reverse converter 12 that converts the DC power from the forward converter 11 into three-phase AC power, and supplies the three-phase AC power to a motor 3. A DC link capacitor 13 is provided to a DC link between the forward converter 11 and reverse converter 12.

Patent Documents 1 to 3 disclose technology for such a motor drive device that detects abnormalities in its own device. In Patent Document 1, technology is described that detects the disconnection of a short bar connecting the DC link unit and inverter unit (corresponding to reverse converter 12 in FIG. 2).

In addition, in Patent Document 2, technology is described that detects abnormalities in its own device, based on the applied voltage value or flowing electric current value. Furthermore, Patent Document 2 describes the matter of inhibiting powering up of its own device based on at least one among the abnormality cumulative incidence frequency, peak voltage value applied to its own device or peak electric current value flowing in its own device, and time course of this peak voltage value or peak electric current value, thereby preventing secondary damage of peripheral equipment of its own device.

In addition, in Patent Document 3, technology is described that detects electric short-circuit failure of a rectifier diode (corresponding to forward converter 11 FIG. 2). Furthermore, Patent Document 3 describes the matter of detecting the loss of only one phase in the three-phase AC power, by differentiating from short-circuiting failure of the rectifier diode.

Patent Document 1: Japanese Unexamined Patent Application, Publication No. 2015-154566
Patent Document 2: Japanese Unexamined Patent Application, Publication No. 2016-100977
Patent Document 3: Japanese Unexamined Patent Application, Publication No. 2015-046962

SUMMARY OF THE INVENTION

However, as shown in FIG. 2, equipment such as a breaker 5A and/or electromagnetic contactor 5B may be provided to the power supply input part 4 at an earlier stage than the motor drive device 1X (i.e. power supply input part between the motor drive device 1X and AC power supply 2).

In such as case, due to failure of the equipment 5, the AC power from the AC power supply 2 may not be supplied to the motor drive device 1X. In this case, the motor drive device 1X will detect the failure of the equipment 5 as failure of its own device. For example, the motor drive device 1X will detect failure of the equipment 5 as a voltage decline in the DC link capacitor 13 of its own device, during motor acceleration. In addition, the motor drive device 1X will detect failure of the equipment 5 as a voltage rise in the DC link capacitor 13 of its own device, during motor deceleration.

In this way, with the conventional motor drive device 1X, it has not been possible to detect failure of the equipment 5 (i.e. abnormality in the power supply input part 4) provided to the power supply input part 4 between the motor drive device 1X and AC power supply 2. It should be noted that the motor drive devices described in Patent Documents 1 to 3 also do not detect failure of equipment provided to the power supply input part between the motor drive device and AC power supply.

Therefore, the present invention has an object of providing a motor drive device that can detect abnormalities in the power supply input part.

(1) A motor drive device (e.g., the motor drive device 1 described later) according to the present invention is a motor drive device having an abnormality detection function for a power supply input part (e.g., the power supply input part 4 described later) between its own device and a power supply (e.g., the AC power supply 2 described later), including: a forward converter (e.g., the forward converter 11 described later) that is inputted AC power from the power supply via the power supply input part, and converts the AC power into DC power; a reverse converter (e.g., the reverse converter 12 described later) that converts the DC power from the forward converter into AC power; a DC link capacitor (e.g., the DC link capacitor 13 described later) provided to a DC link between the forward converter and the reverse converter; a voltage detection part (e.g., the voltage detection part 14 described later) that detects voltage of the DC link capacitor; and an abnormality detection part (e.g., the abnormality detection part 16 described later) that obtains a voltage change amount for a predetermined time of the DC link capacitor based on voltage values detected by the voltage detection part, and performs abnormality detection on the power supply input part based on the voltage change amount thus obtained.

(2) The motor drive device described in (1), the voltage change amount may be a voltage change amount per unit time.

(3) The motor drive device described in (1) or (2) may further include a storage part (e.g., the storage part 15 described later) that stores in advance a threshold for detecting abnormality of the power supply input part, in which the abnormality detection part may detect that the power supply input part is abnormal in a case of the voltage change amount being greater than the threshold.

(4) The motor drive device described in (3), the storage part may externally allow for rewriting of the threshold.

According to the present invention, it is possible to provide a motor drive device that can detect abnormalities in the power supply input part.

DETAILED DESCRIPTION OF THE INVENTION

Hereinafter, an example of an embodiment of the present invention will be explained by referencing the drawings. It should be noted that the same reference symbols shall be attached to identical or corresponding portions in the respective drawings.

First Embodiment

Figure 1:
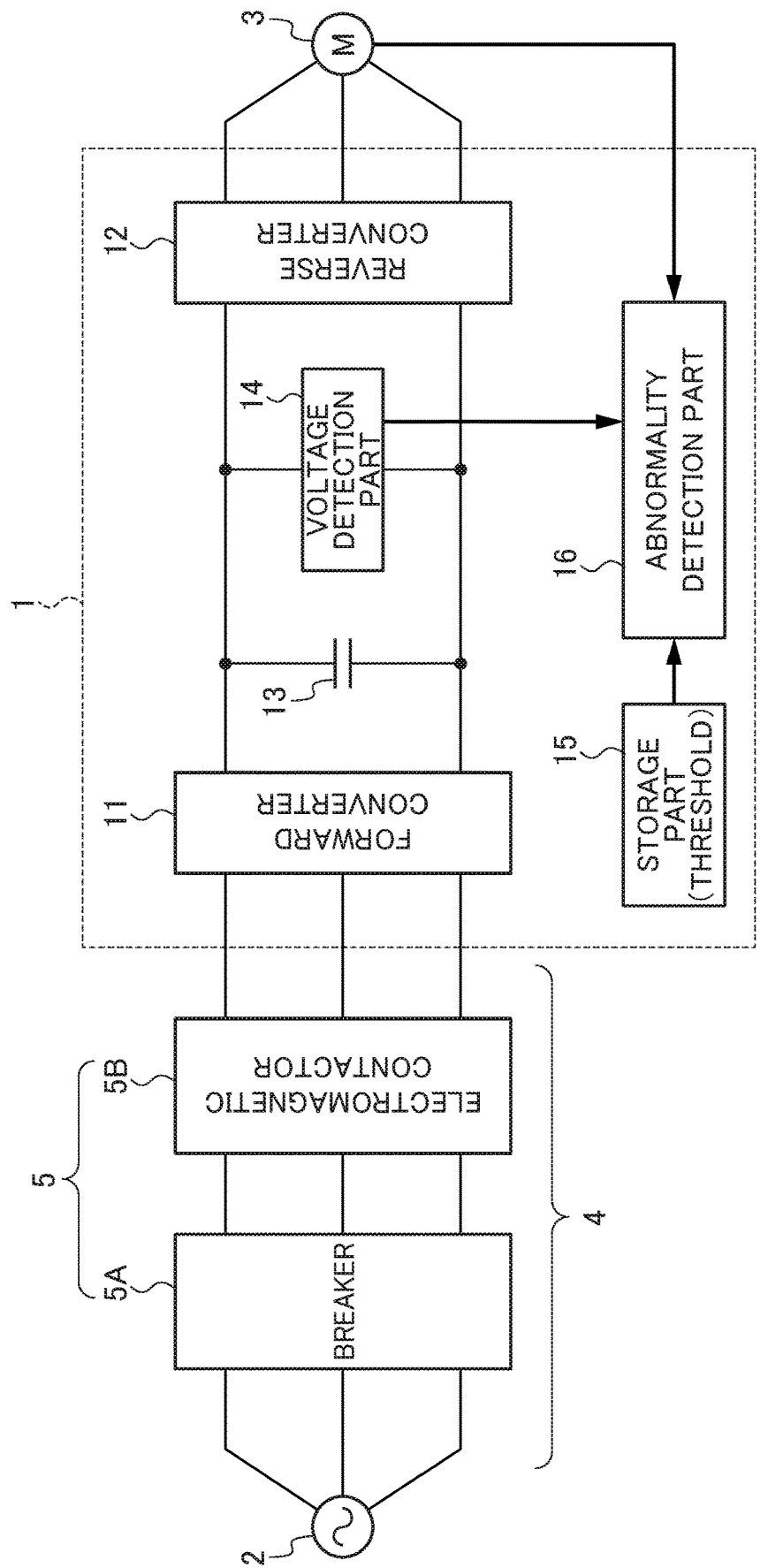
FIG. 1 is a view showing a circuit configuration of a motor drive device according to an embodiment of the present invention.

FIG. 1 is a view showing a circuit configuration of a motor drive device according to a first embodiment of the present invention. The motor drive device 1 shown in FIG. 1 inputs three-phase AC power from a commercial three-phase AC power supply 2 to drive a motor 3. It should be noted that the AC power supply 2 is not limited to three-phase alternating current, and may be single-phase alternating current, for example.

Equipment 5 such as a breaker 5A and electromagnetic contactor 5B are provided to a power supply input part 4 between the motor drive device 1 and AC power supply 2.

The motor drive device 1 includes a forward converter 11, reverse converter 12, DC link capacitor 13, voltage detection part 14, storage part 15, and abnormality detection part 16.

The forward converter 11 converts the AC power from the AC power supply 2 into DC power. The forward converter 11, for example, is configured by a diode rectifying converter or PWM converter having a bridge circuit of power semiconductor devices and diodes connected reversely parallel to the power semiconductor devices.

The reverse converter 12 converts the DC power from the forward converter 11 into AC power, and supplies this AC power to the motor 3. The reverse converter 12, for example, is configured from a bridge circuit having power semiconductor devices and diodes connected reversely parallel to the power semiconductor devices. The reverse converter 12 converts the DC voltage into an AC voltage of a desired waveform and frequency, by on-off controlling (e.g., PWM controlling) these power semiconductor devices according to the commands from a control unit (not illustrated).

In addition, the reverse converter 12 converts the AC power regenerated from the motor 3 into DC power, and supplies this DC power to a DC link between the reverse converter 12 and forward converter 11.

The DC link capacitor 13 is provided to the DC link between the forward converter 11 and reverse converter 12. The DC link capacitor 13 stores the DC power from the forward converter 11 and the DC power (regeneration power) from the reverse converter 12. In addition, the DC link capacitor 13 smooths the DC voltage converted by the forward converter 11 or reverse converter 12.

The voltage detection part 14 is provided in parallel with the DC link capacitor 13, and detects the voltage between both terminals of the DC link capacitor 13. As the voltage detection part 14, it is possible to use an existing voltage detection circuit, for example.

The storage part 15 stores in advance a threshold for detecting failure of the equipment 5 (i.e. abnormality of the power supply input part 4). More specifically, the storage part 15 stores in advance a threshold for detecting a sudden voltage change in the DC link capacitor 13 caused by failure of the equipment 5.

The threshold is set based on the voltage change amount per unit time based on the energy stored in the DC link capacitor 13, and the energy required for acceleration/deceleration operation of the motor 3, for example. More specifically, first, the voltage change amount of the DC link capacitor 13 is obtained in the case of the acceleration energy being supplied to the motor 3 from only the DC link capacitor 13, or the case of deceleration energy being absorbed only in the DC link capacitor 13 from the motor 3, and is set as the rough estimate for the threshold.

The storage part 15 is rewritable memory such as EEPROM, for example. The storage part 15 is thereby able to rewrote the threshold by way of an external device such as a computer, for example. In addition, the storage part 15 stores predetermined software (program) for realizing the various functions of the abnormality detection part 16.

The abnormality detection part 16 obtains a voltage change amount per unit time of the DC link capacitor 13, based on the voltage values detected by the voltage detection part 14. The abnormality detection part 16 performs failure detection for equipment 5 (i.e. abnormality detection of the power supply input part 4), based on the obtained voltage change amount. More specifically, the abnormality detection part 16 detects that the equipment 5 has failed (i.e. the power supply input part 4 is abnormal), in the case of the obtained voltage change amount being greater than the threshold in the storage part 5.

The abnormality detection part 16 is configured by an arithmetic processor such as a DSP (Digital Signal Processor) or FPGA (Field-Programmable Gate Array), for example. The functions of the abnormality detection part 16 are realized by executing predetermined software (programs) stored in the storage part 15. The functions of the abnormality detection part 16 may be realized by cooperation between hardware and software, or may be realized by only hardware (electronic circuits).

Next, the failure detection operation for the equipment 5 (i.e. abnormality detection operation of the power supply input part 4) by the motor drive device 1 will be explained.

First, in the case of the equipment 5 being normal, a major portion of the acceleration energy required during acceleration of the motor 3 is supplied from the AC power supply 2. In addition, the majority of the deceleration energy produced during deceleration of the motor 3 is regenerated in the AC power supply 2.

Next, in the case of AC power from the AC power supply 2 no longer being supplied to the motor drive device 1X due to failure of the equipment 5, when acceleration of the motor 3 is performed, the acceleration energy of the motor 3 will be supplied from only the DC link capacitor 13. However, since the capacity of the DC link capacitor 13 is generally small compared to the power supply capacity, the voltage of the DC link capacitor 13 instantly declines.

The abnormality detection part 16 detects failure of the equipment 5 (i.e. abnormality in the power supply input part 4) based on the voltage change amount (voltage decline amount) which is steep at this time. More specifically, the abnormality detection part 16 obtains the voltage change amount (voltage decline amount) per unit time of the DC link capacitor 13 based on the voltage values detected by the voltage detection part 14, and detects that the equipment 5 has failed (i.e. power supply input part 1 is abnormal), when the obtained voltage change amount is greater than the threshold in the storage part 15.

On the other hand, in the case of the AC power from the AC power supply 2 no longer being supplied to the motor drive device 1X due to failure of the equipment 5, if deceleration (regeneration) of the motor 3 is performed, the deceleration energy of the motor 3 will be stored only in the DC link capacitor 13. However, as mentioned above, since the capacity of the DC link capacitor 13 is small compared to the power supply capacity, the voltage of the DC link capacitor 13 instantly rises.

The abnormality detection part 16 detects failure of the equipment 5 (i.e. abnormality of the power supply input part 4), based on the voltage change amount (voltage rise amount) which is steep at this time. More specifically, the abnormality detection part 16 obtains the voltage change amount (voltage rise amount) per unit time of the DC link capacitor 13 based on the voltage values detected by the voltage detection part 14, and detects that the equipment 5 has failed (i.e. the power supply input part 4 is abnormal), when the obtained voltage change amount is greater than the threshold in the storage part 15.

As explained above, according to the motor drive device 1 of the present embodiment, it is possible to detect a state in which AC power from the AC power supply 2 is no longer supplied to the motor drive device 1, i.e. failure of the equipment 5 (i.e. abnormality of the power supply input part 4 between the motor drive device 1 and AC power supply 2), based on the steep voltage change amount (voltage decline amount) per unit time of the DC link capacitor 13 during acceleration of the motor 3, or the steep voltage change amount (voltage rise amount) per unit time of the DC link capacitor 13 during deceleration of the motor 3.

Figure 2:
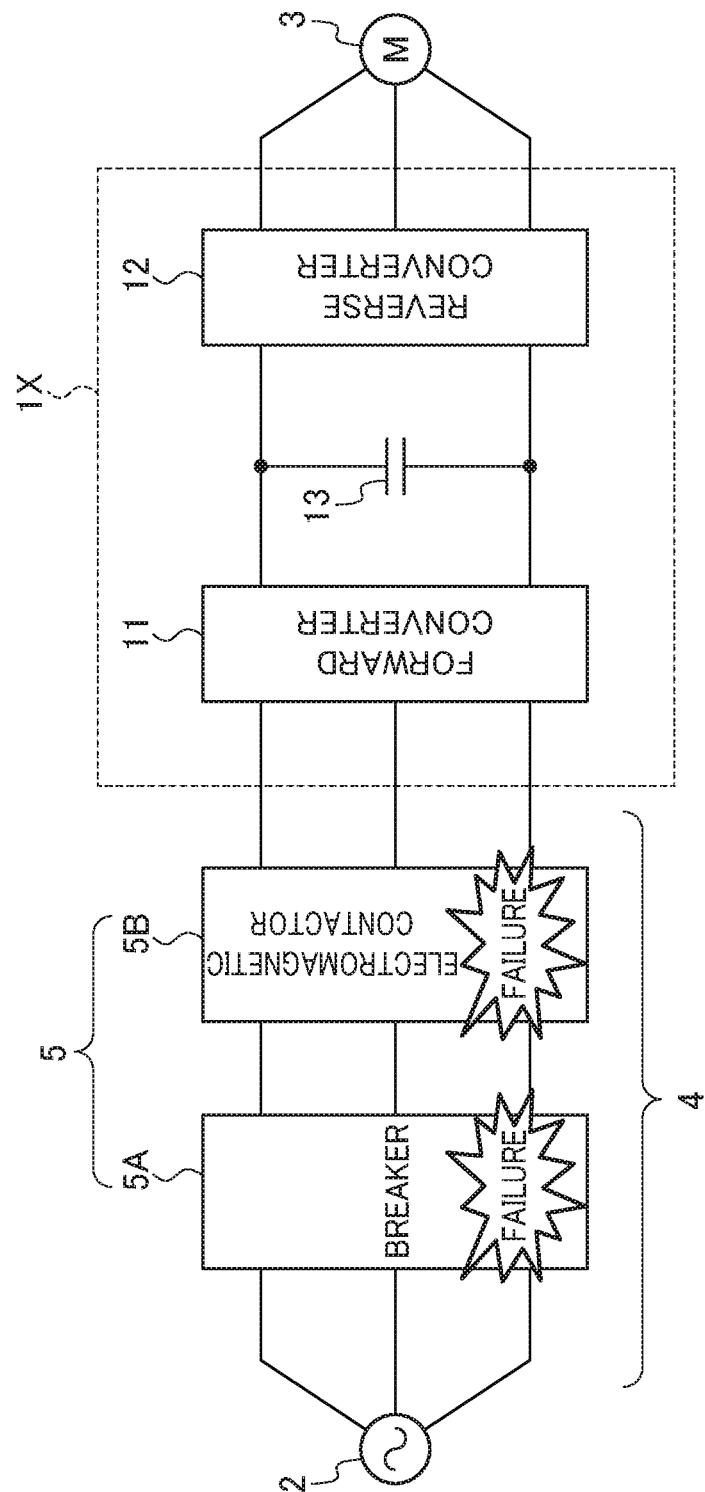
FIG. 2 is a view showing a circuit configuration of a conventional motor drive device.

However, if failure of the equipment 5 is detected as failure of its own device as in the conventional motor drive device 1X shown in FIG. 2, the maintenance provider will mistakenly recognize that the motor drive device 1X failed, irrespective of the motor drive device 1X being normal. As a result thereof, the maintenance provider would start failure investigation from the motor drive device 1X, and thus time would be consumed in specification of the failure actual cause. In addition, during this time, since operating of the machines driven by the motor drive device 1X is suspended, the operating rate of the machine will decline.

Furthermore, in the case of not being able to elucidate the cause of the failure, the maintenance provider may replace the motor drive device 1X itself. However, since the motor drive device is normal, the work hours in such maintenance is wasteful.

In contrast, according to the motor drive device 1 of the present embodiment, the maintenance provider can quickly recognize and elucidate failure of the equipment 5 (i.e. abnormality of the power supply input part 4), and thus time is not required in specification of the failure actual cause. As a result thereof, it is possible to suppress the decline in operation rate of a machine driven by the motor drive device 1.

Furthermore, according to the motor drive device 1 of the present embodiment, a normal motor drive device will not be replaced, and thus it is possible to reduce the workload of maintenance.

In addition, in the motor drive device 1 of the present embodiment, since the threshold is rewritable by an external device, the motor drive device 1 can change the threshold to an appropriate value even after once setting the value.

Second Embodiment

In the first embodiment, failure of the equipment 5 (abnormality of the power supply input part 4) during acceleration or during deceleration of the motor 3 is detected based on the voltage change amount per unit time of the DC link capacitor 13. In the second embodiment, failure of the equipment 5 (abnormality of the power supply input part 4) is detected also during constant speed operation of the motor 3, in addition to during acceleration or during deceleration of the motor 3, based on the voltage change amount per predetermined time of the DC link capacitor 13.

The configuration of the motor drive device 1 according to the second embodiment is identical to the configuration of the motor drive device 1 according to the first embodiment shown in FIG. 1. It should be noted that the motor drive device 1 according to the second embodiment differs from the motor drive device 1 according to the first embodiment in the functions and operation of the abnormality detection part 16, and the threshold stored in the storage part 15.

The storage part 15 stores in advance the threshold for detecting the voltage change for a predetermined time of the DC link capacitor 13 caused by failure of the equipment 5 (i.e. abnormality of the power supply input part 4). The threshold is set based on the voltage change amount per unit time based on the energy stored in the DC link capacitor 13, and the energy required in constant speed operation of the motor 3. More specifically, the voltage change amount of the DC link capacitor 13 is obtained for the case of the energy required in constant speed operation being supplied to the motor 3 for a predetermined time from only the DC link capacitor 13, and is set as the rough estimate for the threshold.

The abnormality detection part 16 obtains the voltage change amount for a predetermined time of the DC link capacitor 13, based on the voltage values detected by the voltage detection part 14. The abnormality detection part 16 performs failure detection of the equipment 5 (i.e. abnormality detection of the power supply input part 4), based on the obtained voltage change amount. More specifically, the abnormality detection part 16 detects that the equipment 5 failed (i.e. the power supply input part 4 is abnormal), in the case of the obtained voltage change amount being greater than the threshold in the storage part 15.

Next, the failure detection operation for the equipment 5 by the motor drive device 1 (i.e. abnormality detection operation for the power supply input part 4) will be explained.

In the case of AC power from the AC power supply 2 no longer being supplied to the motor drive device 1X due to failure of the equipment 5, the energy required in constant speed operation of the motor 3 will be supplied only from the DC link capacitor 13 also during constant speed operation of the motor 3. At this time, the voltage of the DC link capacitor 13 declines according to the motor load.

The abnormality detection part 16 detects failure of the equipment 5 (i.e. abnormality of the power supply input part 4), based on the voltage change amount (voltage decline amount) for a predetermined time at this time. More specifically, the abnormality detection part 16 obtains the voltage change amount (voltage decline amount) for a predetermined time of the DC link capacitor 13 based on the voltage values detected by the voltage detection part 14, and detects that the equipment 5 failed (i.e. the power supply input part 4 is abnormal), when the obtained voltage change amount is greater than the threshold in the storage part 15).

It should be noted that, since a steeper voltage change occurs during acceleration and during deceleration of the motor 3, it is possible to detect that the equipment 5 failed (i.e. the power supply input part 4 is abnormal). Since these operations are the same as the first embodiment, an explanation thereof will be omitted.

It is possible to obtain effects similar to the first embodiment also with this motor drive device 1 of the second embodiment.

Furthermore, according to the motor drive device 1 of the second embodiment, it is possible to detect failure of the equipment 5 (i.e. abnormality of the power supply input part 4 between the motor drive device 1 and AC power supply 2) not only during acceleration and during deceleration of the motor 3, but also during constant speed operation of the motor 3.

Although an embodiment of the present invention has been explained above, the present invention is not to be limited to the aforementioned embodiment. In addition, the effects described in the present embodiment are merely listing the most preferred effects produced from the present invention, and the effects according to the present invention are not to be limited to those described in the present embodiment.

For example, in the aforementioned embodiments, the abnormality detection part 16 detects failure of the equipment 5 (i.e. abnormality of the power supply input part 4 between the motor drive device 1 and AC power supply 2) by comparing between the obtained voltage change amount and a threshold stored in advance; however, the present invention is not to be limited thereto. For example, the abnormality detection part 16 may detect failure of the equipment 5 (i.e. abnormality of the power supply input part 4) when the voltage value changes (declines or rises).

In addition, in the aforementioned embodiments, failure detection of the equipment 5 such as the breaker 5A and electromagnetic contactor 5B provided in the power supply input part 4 is exemplified as the abnormality detection of the power supply input part 4 between the motor drive device 1 and AC power supply 2. However, the present invention is not to be limited thereto, and it is also possible to apply to failure detection of devices such as a power transformer provided in the power supply input part 4, or disconnection detection in a member such as a cable.

EXPLANATION OF REFERENCE NUMERALS

1, 1X motor drive device
2 AC power supply
3 motor
4 power supply input part
5 equipment
5A breaker
5B electromagnetic contactor
11 forward converter
12 reverse converter
13 DC link capacitor
14 voltage detection part
15 storage part
16 abnormality detection part

What is claimed is:

1. A motor drive device having an abnormality detection function for a power supply input part between the motor drive device and a power supply, the motor drive device comprising:
    a forward converter that is inputted AC power from the power supply via the power supply input part, and converts the AC power into DC power;
    a reverse converter that converts the DC power from the forward converter into AC power;
    a DC link capacitor provided to a DC link between the forward converter and the reverse converter;
    a voltage detection part that detects voltage of the DC link capacitor;
    an abnormality detection part that obtains a voltage change amount per unit time of the DC link capacitor based on voltage values detected by the voltage detection part, and performs abnormality detection on the power supply input part based on the voltage change amount thus obtained; and
    a storage part that stores in advance a threshold for detecting abnormality of the power supply input part,
    wherein the abnormality detection part detects that the power supply input part is abnormal in a case of the voltage change amount being a decrease in voltage per unit time greater than the threshold, and
    wherein the abnormality detection part detects that the power supply input part is abnormal in a case of the voltage change amount being an increase in voltage per unit time greater than the threshold.

2. The motor drive device according to claim 1, wherein the storage part externally allows for rewriting of the threshold.

3. The motor drive device according to claim 1, wherein the power supply input part includes at least one of a breaker, an electromagnetic contactor, and a power transformer.

4. The motor drive device according to claim 1, wherein the power supply input part includes a cable.

* * * * *